(12) United States Patent
Gschwind et al.

(10) Patent No.: US 7,725,682 B2
(45) Date of Patent: May 25, 2010

(54) METHOD AND APPARATUS FOR SHARING STORAGE AND EXECUTION RESOURCES BETWEEN ARCHITECTURAL UNITS IN A MICROPROCESSOR USING A POLYMORPHIC FUNCTION UNIT

(75) Inventors: Michael Gschwind, Chappaqua, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 11/329,320

(22) Filed: Jan. 10, 2006

(65) Prior Publication Data

US 2007/0162726 A1    Jul. 12, 2007

(51) Int. Cl.
  G06F 15/00   (2006.01)
  G06F 15/76   (2006.01)
(52) U.S. Cl. ...................................... 712/43
(58) Field of Classification Search .......... 712/20, 712/43, 226, 228, 229
  See application file for complete search history.

(56) References Cited

U.S. PATENT DOCUMENTS

| | | | | |
|---|---|---|---|---|
| 5,598,546 | A * | 1/1997 | Blomgren | 712/209 |
| 5,659,721 | A * | 8/1997 | Shen et al. | 712/228 |
| 5,774,686 | A * | 6/1998 | Hammond et al. | 712/209 |
| 5,794,024 | A * | 8/1998 | Golla et al. | 712/228 |
| 6,178,482 | B1 | 1/2001 | Sollars | |
| 6,366,998 | B1* | 4/2002 | Mohamed | 712/17 |
| 6,430,674 | B1* | 8/2002 | Trivedi et al. | 712/43 |
| 6,839,828 | B2 | 1/2005 | Gschwind et al. | |
| 2005/0160097 | A1 | 7/2005 | Gschwind et al. | |

FOREIGN PATENT DOCUMENTS

WO   WO 2004049152 A1  *   6/2004

OTHER PUBLICATIONS

Shen & Lipasti; Modern Processor Design: Fundamentals of Superscalar Processors; 2003; McGraw Hill; Beta Edition; pp. 178-179.*

Handy; The Cache Memory Book; 1998; Academic Press; Second Edition; p. 27.*

(Continued)

*Primary Examiner*—Eddie P Chan
*Assistant Examiner*—Corey Faherty
(74) *Attorney, Agent, or Firm*—Tutunjian & Bitetto, P.C.; Kenneth Corsello, Esq.

(57) ABSTRACT

Methods and apparatus are provided for sharing storage and execution resources between architectural units in a microprocessor using a polymorphic function unit. A method for executing instructions in a processor having a polymorphic execution unit includes the steps of reloading a state associated with a first instruction class and reconfiguring the polymorphic execution unit to operate in accordance with the first instruction class, when an instruction of the first instruction class is encountered and the polymorphic execution unit is configured to operate in accordance with a second instruction class. The method also includes the steps of reloading a state associated with a second instruction class and reconfiguring the polymorphic execution unit to operate in accordance with the second instruction class, when an instruction of the second instruction class is encountered and the polymorphic execution unit is configured to operate in accordance with the first instruction class.

20 Claims, 7 Drawing Sheets

OTHER PUBLICATIONS

Hauser et al.; Garp: A MIPS Processor with a Reconfigurable Coprocessor; 1997; IEEE; SFPGACCM '97; pp. 24-33.*

Butts et al.; "Use-Based Register Caching with Decoupled Indexing"; Proceedings of the 31st Annual Int'l Symposium on Computer Architecture; (ISCA 04) IEEE, Munchen, Germany, Jun. 2004; 12 pages.

Ansari et al,; "Accelerated System Performance with APU-Enhanced Processing", Xcell Journal; First Quarter, 2005; 4 pages.

IBM; "Power PC 440 Processor Core"; Product Brief; Mar. 2004; 4 pages.

Hauck et al.; "The Chimaera Reconfigurable Functional Unit", IEEE Symposium on FPGAs for Custom Computing Machines, 1997; 10 pages.

* cited by examiner

METHOD AND APPARATUS FOR SHARING STORAGE AND EXECUTION RESOURCES BETWEEN ARCHITECTURAL UNITS IN A MICROPROCESSOR USING A POLYMORPHIC FUNCTION UNIT

This invention was made with Government support under Contract No.: NBCH3039004 awarded by the Defense Advanced Research Project Agency. The Government has certain rights in this invention.

BACKGROUND

1. Technical Field

The present invention generally relates to the processing of instructions in a microprocessor and, more particularly, to a method and apparatus for sharing storage and execution resources between architectural units in a microprocessor.

2. Description of the Related Art

In modern microprocessors, significant amounts of resources are duplicated between the Single Instruction-Stream, Multiple Data-Stream (SIMD) and scalar data paths. For example, such duplication is more prevalent for microprocessors which have large execution units, such as floating point, and particularly, double precision floating point computation. This undesirable duplication of resources leads to increased chip area, reduced yield, slower clock frequencies, higher power dissipation and overall higher cost and lower performance.

Thus, it is preferable to reduce chip area and design complexity by sharing resources between similar execution units, such as scalar and vector floating point units. A variety of approaches have been implemented for architectural sharing. For newer microprocessor designs, one such approach is to architect a single scalar/vector unit, which performs execution of both scalar and vector operations from a shared storage resource, and in a shared data path. An exemplary implementation of such a modern instruction set architecture (ISA) is the Cell Broadband Engine Synergistic Processor Unit (SPU), which uses the described approach in accordance with U.S. Pat. No. 6,839,828 to Gschwind et al., entitled "Simd Datapath Coupled to Scalar/Vector/Address/Conditional Data Register File with Selective Subpath Scalar Processing Mode", issued on Jan. 4, 2005, and U.S. patent application Ser. No. 11/065,707, to Gschwind et al., entitled "SIMD-RISC Microprocessor Architecture", filed on Feb. 24, 2005, which are commonly assigned and incorporated by reference herein.

In another approach to architectural sharing, SIMD FP execution units such as the IBM BlueGene/L Double Floating Point Unit, and the INTEL SSE2 instruction set extensions, use a subfield of the SIMD unit for scalar computation using dedicated load and store operations to that subfield.

Alternatively, in yet another approach to architectural sharing, for designs which have architected separate execution primitives and separate storage resources, a large physical storage resource can be employed that stores the architected state for both separate architected storage facilities in a large common array. This approach is employed by recent implementations of the INTEL x86 and AMD64 architectures by INTEL and AMD, wherein traditional stack-oriented x87 FP registers, multi-media extensions (MMX) registers, and Streaming SIMD Extension (SSE) registers are stored in a common physical array.

The sharing of register files is advantageous in the case when dynamic usage in a specific program or program phase uses a specific register file heavily, while making little or no use of another register file, wherein the physical registers can be allocated to the heavily used register file.

Thus, sharing a physical register file between multiple architectural register files leads to better resource utilization. However, while implementations sharing a physical register file, by allocating multiple architectural register files within a single physical register file (such as the x87 FP registers, the MMX registers, and/or the SSE registers in the AMD64 architecture), allow efficient sharing of rename registers, resource wastage accrues from unused but allocated architected registers which are of no use to program execution.

Thus, a large architected register file allocated commonly to all units would be more advantageous, by allowing sharing and dynamic allocation of physical registers according to program usage, under compiler control. In addition, sharing of data between different units becomes effortless, as no move instruction between architected register files (possibly via memory, as is the case in several modern instruction set architectures) is necessary.

Unfortunately, current industry standard instruction set architectures already specify preexisting register files which have to be maintained even if newer execution resources are defined and architected for future microprocessor implementations.

In another aspect of modern microprocessor implementation, execution data paths should advantageously be shared between different execution units. Thus, a floating point operation executed using a scalar floating point instruction should advantageously use the same floating point unit as a floating point instruction executed as part of a SIMD instruction sequence.

For example, a future industry standard processor may want to employ an improved merged scalar/vector floating point unit, yet retain high performance compatibility with legacy architectures.

However, sharing execution units is difficult if data is to be sourced from different physical register files, requiring input operand data routing from several physical register files, and data operand selection from such files, and result data routing to multiple register files. This inevitably will increase chip area and degrade performance.

In the prior art, the sharing of register files has been implemented at the architectural level. Thus, the MMX and INTEL x87 stack-oriented floating point architecture architecturally share the register file in a mutually exclusive fashion. The primary motivation between this architectural sharing of two register files between a first MMX unit and a second floating point unit was to minimize required changes in operating systems during the process context switch sequence. Effectively, selection of architectural context stored in the single architectural register file storing exclusively one of either floating point or MMX data was under user control with no system provision to store state information upon a context switch.

This use is cumbersome and inefficient, requiring the user code to identify all possible code paths through a user application, and insert explicit architectural register file context switch sequences in the user program. Additionally, static analysis has to be conservative, introducing architectural register file context switch sequences when an architectural register file context switch is possible, but does not actually occur, leading to significant performance reduction due to the execution of extraneous architectural context switch sequences. Finally, such an implementation is not compatible with current industry standard instruction sets which specify the existence of separate and independent architectural register files, such as between the IBM Power Architecture™ floating point and Vector/SIMD Media eXtension (VMX), or the AMD64 instruction set x87 floating point unit and SSE SIMD instructions.

U.S. Pat. No. 6,178,482 to Sollars, entitled "Virtual register sets", which is incorporated by reference herein, discloses an implementation of virtual register files. In particular, the use of virtual register sets is disclosed wherein multiple register files are maintained in a cache, and accessed from the cache. While this allows for the maintaining of multiple register files, it involves long access paths to a cache and access to a large array, leading to long access latencies for registers and, hence, performance degradation. This design approach will also include control complexity by requiring synchronizing data cache and register file accesses. Further, this requires the management of tags and other aspects of a cache which are not typically required for performing cache accesses and, hence, constitute additional overhead in performing a register access.

Butts et al., in "Use-Based Register Caching with Decoupled Indexing", Proceedings of the 31st annual international symposium on Computer architecture, München, Germany, June 2004, provide a review of prior art hierarchical register file designs. In hierarchical register file designs, a multi-level register file hierarchy is used to store the values of architected registers. According to hierarchical register file designs, frequently used values are stored in a small array in proximity to execution resources, and infrequently accessed values in a larger, slower array. Using a hierarchical storage has a number of costs associated therewith including that the design must identify the presence or non-presence of a value in the fast storage, based on some table-of-content structures, such as a register map, tags associated with registers, or another indirection or content-addressable structure. This analysis must be performed based on the specific register name, and when multiple operands are present, for each of the multiple operands. This analysis has a significant cost in power, and possibly latency. Furthermore, design complexity is increased.

In addition, using hierarchical register files to implement multiple architected register files does not mitigate some of the inconsistencies associated with implementing a monolithic array to store multiple architected registers files, such as that found in recent implementations of the x86 and AMD64 architecture. Specifically, all register files need to be mapped into a common address space, with internal register specifiers having a suitably large number of register specifier bits in a unified register address space. Specifically, this increases operation latency to determine bypass and/or dependence conditions, map table access, and so forth.

Mapping multiple architectural register files into a single large common physical register file thus has several disadvantages. On such disadvantage is, at a minimum, physical registers for all architectural registers have to be allocated to maintain their architected state even if they are otherwise unused. Another disadvantage is that mapping multiple architectural register files into a single physical register file to be simultaneously resident therein requires all architectural names to be mapped to a common internal register specifier name space, leading to the requirement for long internal register specifiers, thereby degrading performance. Yet another disadvantage is that providing simultaneous storage for multiple architected register files and their rename registers may lead to a large physical register file, thereby leading to long access latencies.

Building multi-level register files or register file caches is not advantageous, because register file caches still require the use of long register specifier names for determining if a specific register is in the top-level register file hierarchy, as well as requiring expensive CAM-like accesses to the register file.

In reducing design area, complexity and power consumption by sharing execution resources between architectural units, it is preferable to allow a common data path to execute similar operations specified for different architectural units. Thus, a floating point operation executed using a scalar floating point instruction should advantageously use the same floating point unit as a floating point instruction executed as part of a SIMD instruction sequence.

Unfortunately, the architectural specification of similar operations often differs in semantic details. For example, in the AMD64 instruction set, multiple definitions of floating point operations are present in the form of instructions from the x87 legacy floating point unit operating on an extended range 80 bit floating point definition, the AMD 3DNow SIMD instructions, and the SSE/SSE2/SSE3 extensions. Similarly, the Power Architecture™ defines floating point operations in a scalar FP unit having either 32 or 64 bits of data width and supporting multiple rounding modes, and a number of IEEE specified floating point status bits specified and maintained in the Power Architecture™ FPSCR status register, as well as optionally precise exceptions, the Power Architecture™ VMX instruction set extensions specify 32 bit floating point operations with a single default rounding mode, de-normalized number handling specified in a separate VSCR vector status and control register, and no exception support. Similarly, the IBM zSeries ESAME architecture specification specifies two different floating point instruction families, using a first IBM System/360 compliant hexadecimal floating point representation, and a second IEEE-compliant binary floating point representation.

In one implementation of a common data path, instruction characteristics, such as the use of 80 bit or 64 bit floating point representation, the use of Floating Point Status and Control Register (FPSCR) specified FP rounding or VMX default rounding, and the use of hexadecimal or binary floating point computation formats, are specified with each operation passed to the common data path.

Thus, it is preferable to have a methodology that allows similar, but not identical, operations to be executed on a common data path by reconfiguring the data path. Unfortunately, this leads to long internal representations of instructions specifying a variety of options, as well as slow cycle time, as these options have to be dynamically selected using a variety of selectors embedded in the data path. However, it should be noted that the use of different architectural specifications is usually not interleaved in a fine-grained manner in application programs.

Thus, a typical program might use either the legacy x87-based 80 bit floating point specification or the SSE2-based 64 bit floating point specification on an AMD64-instruction set processor. In such an execution environment, the processor would see either exclusively x87 floating point or SSE2 floating point operations for a given program, until the user application program context is switched by the operating system. In another aspect of programs that use multiple floating point specifications, some modules may use a legacy x87 floating point specification, while other modules have been upgraded. In such an execution environment, the processor would see either exclusively x87 floating point or SSE2 floating point operations for a given module, until control is transferred to a module using the other representation.

Similarly, Power Architecture™ environments in use today typically include programs which either use the floating point architecture or the VMX architecture. In some applications, some compute critical kernels with long execution times have been rewritten to exploit the VMX specification, while other modules use the scalar FP instruction set.

Similarly, zseries environments in use today may typically either execute MVS code using preexisting applications exploiting the IBM System/360 hexadecimal floating point execution environment, or Linux code using newly compiled UNIX applications exploiting the IEEE binary floating point execution environment.

Thus, it is preferable to reduce the size of internal operation codes and eliminate the need to select operation specifics in response to every single operation received.

In the prior art, the use of field-programmable gate array (FPGA) configurable function units has been proposed. Hauck et al., in "The Chimaera Reconfigurable Functional Unit", IEEE Symposium on FPGAs for Custom Computing Machines, 1997, the disclosure of which is incorporated by reference herein, describes the use of an FPGA based functional unit. In accordance therewith, instructions are decoded by instruction decoding logic, and then transmitted to the FPGA. Moreover, different FPGA configurations are loaded into a reconfigurable function unit which is managed as a cache of recently used configurations.

While the approach by Hauck et al. allows access to a working set of FPGA configurations, the approach is inadequate for the efficient processing of general purpose instruction sets. First, FPGA configurations are inefficient in terms of areas usage, power and speed, because multiple physical gates must switch to simulate a single logical gate in an FPGA configuration. Customized logic, which directly implements functions such as floating point or integer data paths as used in microprocessors using advanced circuit techniques, leads to better area, power and performance efficiency. Thus, it is preferable to implement logic such that it is reflected in the manufacture of a processor to eliminate the inefficiencies associated with field-programmable gate arrays. Second, the described approach does not support the concept of instructions being part of an instruction repertoire associated with a particular architectural unit, where one or another unit is typically used at a given time. Thus, there is no provision for loading and unloading state information for different register files associated with different architectural units. Furthermore, there is no concept of shared primitives which need to be configured to match the semantics of a particular architectural specification for a unit. Finally, the RFU proposed by Hauck et al. loads configurations for instructions which define these specific instructions, and does not reconfigure the unit for an architectural unit supporting a repertoire of instructions. Thus, a sequence of instructions would each require the separate overhead of reloading.

While the above and related prior art have suggested the use of configurable FPGA logic to implement different types of user defined instructions, the purpose of a polymorphic unit is different. For example, one purpose of a polymorphic unit is to provide an optimized implementation of a specific set of functionality, where the implementation includes loading a specific configuration to control the semantics of these predefined operations, including, but not limited to, single or double precision operations, rounding, de-normalized number handling, saturation, overflow handling, exception handling, tracking of exception events in status and control registers, so as to operate in accordance with a selected set of instructions. In a polymorphic unit as utilized in accordance with an embodiment herein, the configurations are limited to related classes of instructions defined when the polymorphic execution unit is architected, and optimizing the implementation for this set of operations to allow the efficient implementation of hardware specific to the instruction functions. In comparison, FPGA function is defined to implement general logic gates, to allow users of FPGA technology to define operations after the manufacture of FPGAs, and under the specification of the FPGA user. The result of this overly general flexibility is low computing density, and low operation frequency.

While FPGAs offer flexible logic gates to be defined by users, state management in accordance with proposed FPGA extensions is limited. Operand state is considered to be maintained in the FPGA logic, or delivered from a fixed register file. As a result, proposals for FPGA configurable units are limited in how program state can be used by user-defined instructions. Specifically, these extensions do not include the ability to dynamically associate a polymorphic register file with a first or a second class of instructions, and to reload said state in response to a encountering an instruction of a specific instruction class.

In another aspect of prior art, APU ports are used in embedded Power Architecture™ processor cores to provide designer-specified application specific processing units, as described in "PowerPC® 440 Processor Core", Product Brief, available at http://www-306.ibm.com/chips/techlib/techlib.nsf/techdocs/F72367F770327F8A87256E63006CB7EC/$file/PPC440Core3-24.pdf, March 2004, the disclosure of which is incorporated by reference herein. Unfortunately, application-specific processing units can only be selected during design time and, hence, do not provide the flexibility to provision different capabilities according to program usage of dynamically loaded programs.

In the context of Power Architecture cores embedded in FPGAs, Ansari et al., in "Accelerated System Performance with APU-Enhanced Processing", Xcell Journal First Quarter, 2005, available at http://www.xilinx.com/publications/xcellonline/xcell_52/xc_pdf/x c_v4acu52.pdf, the disclosure of which is incorporated by reference herein, discloses the use of the PowerPC® 405 APU port in the PowerPC® cores embedded in the XIlinx Virtex-4 FX family. The Auxiliary Processor Unit (APU) controller is a key embedded processing feature in the Virtex-4 FX family. However, APU reconfiguration must either be done in the FPGA configuration bits stream, e.g., at FPGA logic design time, or using a DCR interface which requires programs to explicitly re-provision the APU logic not unlike program based reconfiguration between MMX and legacy x87 function use.

SUMMARY

The present invention is directed to methods and apparatus for sharing storage and execution resources between architectural units in a microprocessor using a polymorphic function unit.

According to an aspect of the present invention, there is provided a method for executing instructions in a processor having a polymorphic execution unit. The method includes the steps of reloading a state associated with a first instruction class and reconfiguring the polymorphic execution unit to operate in accordance with the first instruction class, when an instruction of the first instruction class is encountered and the polymorphic execution unit is configured to operate in accordance with a second instruction class. The method also includes the steps of reloading a state associated with a second instruction class and reconfiguring the polymorphic execution unit to operate in accordance with the second instruction class, when an instruction of the second instruction class is encountered and the polymorphic execution unit is configured to operate in accordance with the first instruction class.

According to another aspect of the present invention, there is provided a processor. The processor includes a polymorphic execution unit, having shared logic, and being reconfigurable to switch between operating in accordance with a first or a second instruction class, respectively, based upon whether a currently encountered instruction is of the first instruction class and the polymorphic execution unit is currently configured to operate in accordance with the second instruction class, or the currently encountered instruction is of the second instruction class and polymorphic execution unit is currently configured to operate in accordance with the first instruction class, respectively. The processor also includes a decode unit configured to provide an indication of a current mis-configured state when an instruction class of the currently encountered instruction differs from that of a current configuration of the polymorphic execution unit.

According to yet another aspect of the present invention, there is provided an integrated circuit. The integrated circuit includes a processor, having at least one configurable execution unit and shared logic, configurable to switch from executing instructions in accordance with a first and a second class of instructions based on a current configuration of at least one of the at least one configurable execution unit and an instruction class of a currently encountered instruction. The shared logic of the polymorphic execution unit is manufactured to include at least one fixed function data path. Operation semantics of the at least one fixed function data path are selected under the control of configuration information indicating a selection of operation semantics in accordance with one of the first and the second instruction classes.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
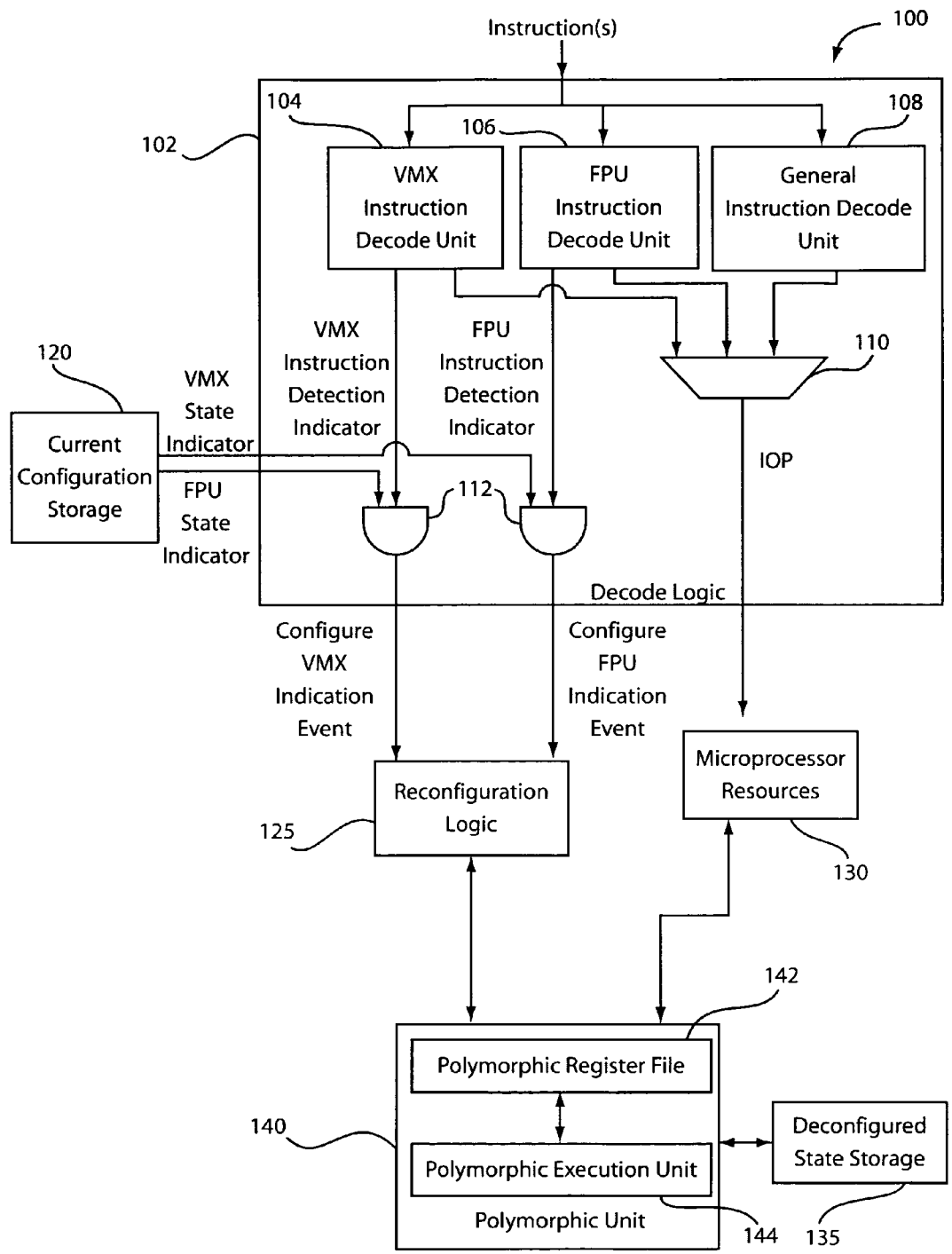
FIG. 1A is a block diagram illustrating an apparatus for executing VMX and floating point instructions on a common polymorphic execution unit in accordance with the principles of the present invention.

The present invention is directed to methods and apparatus for sharing storage and execution resources between architectural units in a microprocessor using a polymorphic function unit.

It should be understood that the elements shown in the FIGURES may be implemented in various forms of hardware, software or combinations thereof. Preferably, these elements are implemented in or used by software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

If the invention is a circuit: The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic-masks, which typically include multiple copies of the chip design in question that are to be formed on a wafer. The photolithographic masks are utilized to define areas of the wafer (and/or the layers thereon) to be etched or otherwise processed.

Referring now to the drawings in which like numerals represent the same or similar elements and initially to FIG. 1A, an exemplary apparatus for executing VMX and floating point instructions on a common polymorphic execution unit in a processor is indicated generally by the reference numeral 100.

The apparatus 100 includes decode logic 102, current configuration storage 120, reconfiguration logic 125, microprocessor resources 130, de-configured state storage 135, and a polymorphic unit 140.

The decode logic 102 includes a VMX instruction decode unit 104, a FPU instruction decode unit 106, a general instruction decode unit 108, a multiplexer 110, and logic gates 112.

The polymorphic unit 140 includes a polymorphic register file 142 and a polymorphic execution unit 144.

Figure 1B:
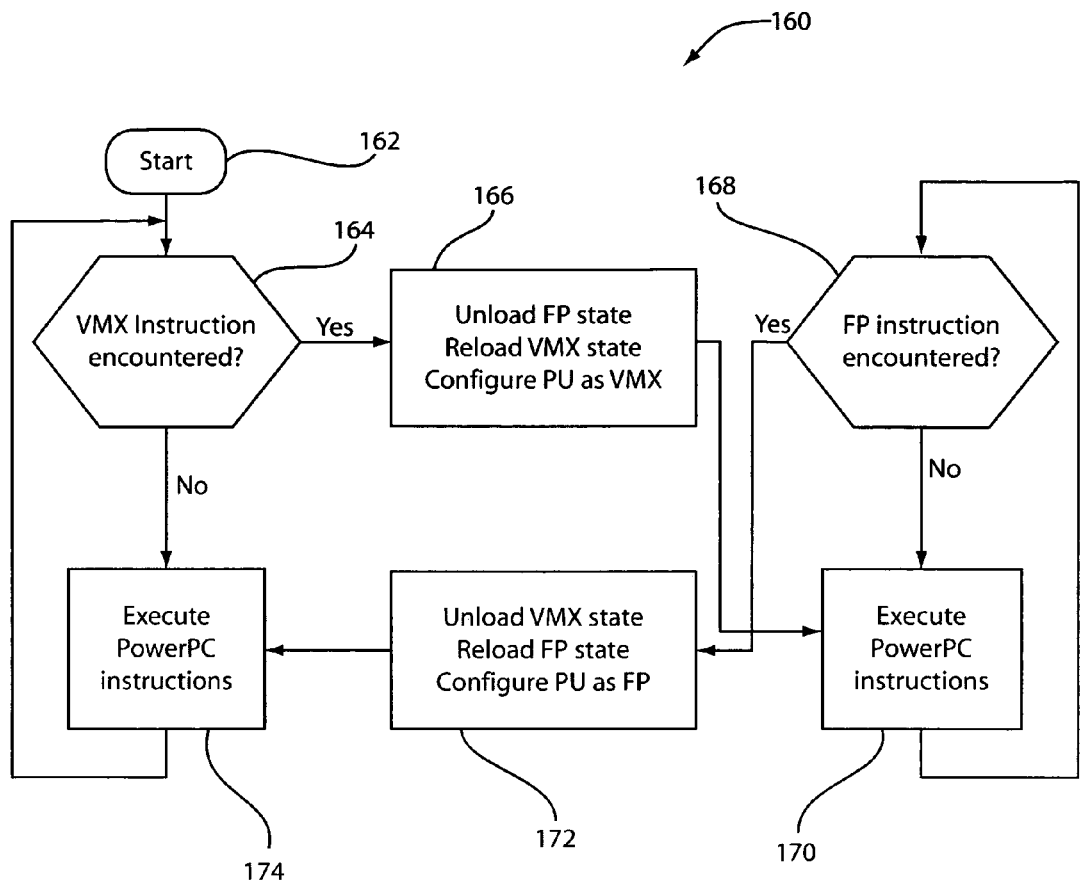
FIG. 1B is a flow diagram illustrating an exemplary method for executing VMX and floating point instructions on a common polymorphic unit in accordance with the principles of the present invention.

Turning to FIG. 1B, an exemplary method for executing VMX and floating point instructions on a common polymorphic unit in a processor is indicated generally by the reference numeral 160.

A start block 162 passes control to a function block 164. The function block 164 performs a test to determine whether or not a VMX instruction has been encountered. If a VMX instruction has not been encountered, then control is passed to a function block 174. Otherwise, if a VMX instruction has been encountered, then control is passed to a function block 166.

The function block 174 executes the current Power Architecture™ instruction, and returns control to function block 164. Regarding function block 174, if the current Power Architecture™ instruction is an FPU instruction, then the current Power Architecture™ instruction is executed on a polymorphic unit configured to perform floating point operations, generally corresponding to the polymorphic unit being configured in a first mode.

Regarding the function block 166, a VMX instruction has been encountered. For example, the VMX instruction has been encountered while the polymorphic unit is configured to be used as floating point unit in accordance with the Power Architecture™ instruction set specification, and the register file of the polymorphic unit includes the architectural state of the floating point register file specified by the Power Architecture™ instruction set architecture specification.

The function block 166 stores the floating point state, which includes the floating point register file and optionally other floating point state information such as the FPSCR register, in a storage area for retaining architected floating point state. Moreover, the function block 166 reloads the VMX state, including the VMX register file and, optionally, other VMX unit state information including bit not limited to the VRSAVE register and the VSCR register, from a storage area for retaining architected VMX state. Further, the function block 166 configures the polymorphic function unit to operate with semantics in accordance with the VMX specification of the Power Architecture™, and passes control to a function block 170.

The function block 170 executes the current Power Architecture™ instruction, and passes control to function block 168. Regarding function block 170, if the current Power Architecture™ instruction is a VMX instruction, then the current Power Architecture™ instruction is executed on a polymorphic unit configured to perform VMX operations.

The function block 168 performs a test to determine whether or not an FPU instruction has been encountered. If an FPU instruction has not been encountered, then control is returned to function block 174. Otherwise, if an FPU instruction has been encountered, then control is passed to a function block 172.

Regarding the function block 172, a floating point instruction has been encountered. For example, a floating point instruction has been encountered while the polymorphic unit is configured to be used as VMX unit in accordance with the Power Architecture™ instruction set specification, and the register file of the polymorphic unit includes the architectural state of the VMX register file specified by the Power Architecture™ instruction set architecture specification.

The function block 172 stores the VMX state, including the VMX register file and, optionally, other VMX unit state information including but not limited to the VRSAVE register and the VSCR register, in a storage area for retaining architected VMX state. Moreover, the function block 172 reloads the floating point state, including the floating point register file and, optionally, other floating point state information including but not limited to the FPSCR register, from a storage area for retaining architected floating point state. Further, the function block 172 configures the polymorphic function unit to operate with semantics in accordance with the FPU specification of the Power Architecture™, and returns control to function block 174.

The storage area for storing dormant VMX or FPU state information, e.g., state information not currently loaded and enabled for operation in the polymorphic unit, can be a memory included on the chip. For example, the storage area may be, but is not limited to, a register file, a RAM (e.g., a static RAM), and so forth. Moreover, the on-chip memory may have multiple ports, or may have a single port. Moreover, in another embodiment, dormant state is stored in main memory. A single area can be used to hold either FP or VMX state, depending on what state is currently dormant. Multiple areas can be used, for FP and VMX, respectively.

The unloading, loading and reconfiguration can be performed under the control of, e.g., dedicated logic circuits, a state machine, microcode, firmware code, hypervisor, the operating system, and/or a dedicated function executing in user space.

The method 160 of FIG. 1B presumes that the processor initially starts with the polymorphic unit configured as floating point unit. In an alternate embodiment, execution of the method 160 begins with function block 168 with the polymorphic unit initially configured as a VMX unit. In another embodiment, firmware, the hypervisor, the operating system, and/or a user program may perform an initial configuration before the polymorphic unit can be used.

While the method 160 of FIG. 1B has been described in terms of two exemplary execution modes corresponding to a first Power Architecture™ floating point and a second Power Architecture™ VMX unit, it is to be appreciated that, given the teachings provided herein, other architectural units or subunits may be implemented on a common polymorphic unit. In another embodiment, more than two units (or subunits) are implemented using a single or multiple polymorphic units. In one embodiment with multiple polymorphic units, each polymorphic unit can be configured separately. In another embodiment with multiple polymorphic units, all polymorphic units can be configured separately. In yet another embodiment with multiple polymorphic units, multiple polymorphic units can be configured to implement a single architectural unit (e.g., by supplying multiple slots of a wide vector instruction), or as independent units.

While the method 160 of FIG. 1B has been described in terms of the Power Architecture™ specification, using exemplary VMX and FPU units for sharing a common functional unit, it is to be appreciated that, given the teachings provided herein, other architectures and/or different function units may also be used.

Figure 2:
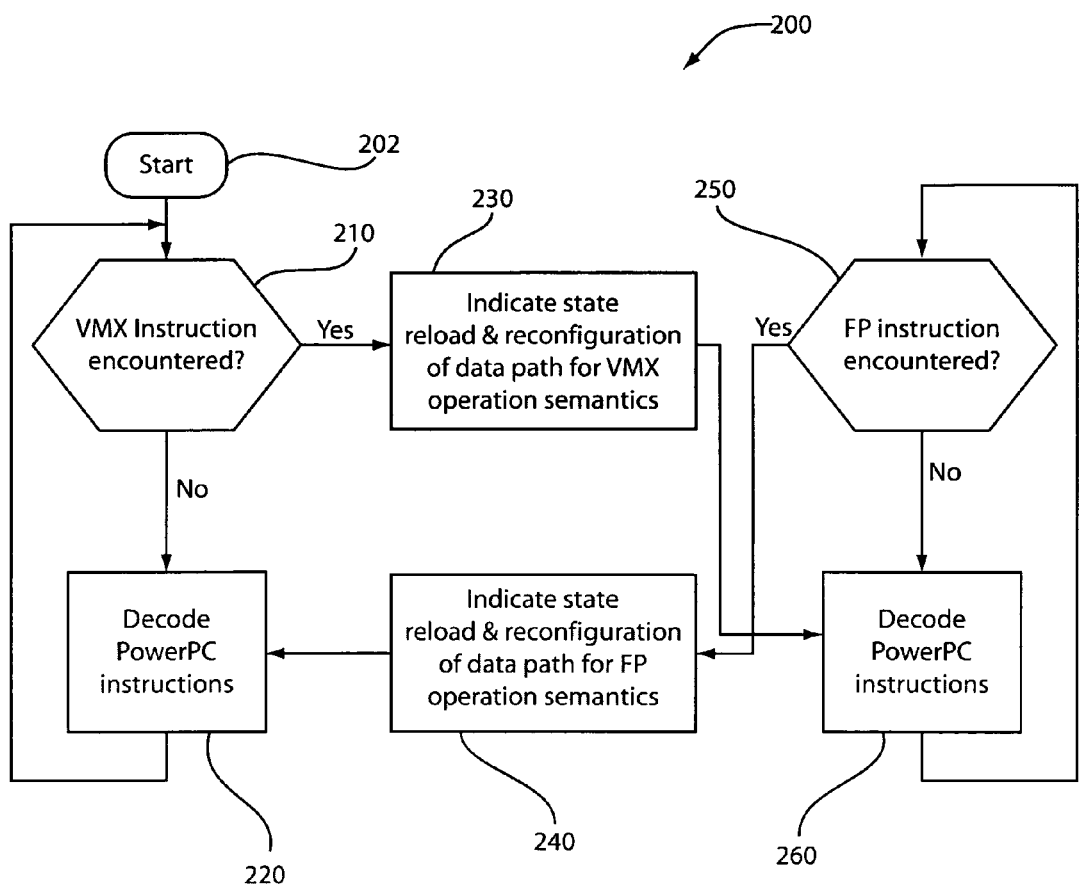
FIG. 2 is a flow diagram illustrating an exemplary method for decoding instructions for a processor implementing floating point and VMX on a common polymorphic unit in accordance with the principles of the present invention.

Turning now to FIG. 2, an exemplary method for decoding instructions for a processor implementing floating point and VMX on a common polymorphic unit is indicated generally by the reference numeral 200. The common polymorphic unit includes a shared data path and a single physical register file holding either floating point or VMX state information. The corresponding decode logic is configured to decode either floating point instructions or VMX instructions, and perform an indication step if a non-configured instruction is processed.

A start block 202 passes control to a function block 210. The function block 210 performs a test to determine whether or not a VMX instruction has been encountered. If a VMX instruction has not been encountered, then control is passed to a function block 220. Otherwise, if a VMX instruction has been encountered, then control is passed to a function block 230.

The function block 220 decodes the current Power Architecture™ instruction, and returns control to function block 210. Method step 220 generally corresponds to a decode unit having a first mode of operation in an apparatus. Regarding function block 220, the decoding of the current instruction may involve generating internal operation codes, generating one or more microcode sequences, extracting register specifiers, and immediate fields, and so forth. Moreover, if the current Power Architecture™ instruction is an FPU instruction, then function block 220 routes the current Power Architecture™ instruction to the polymorphic function unit.

Regarding the function block 230, a VMX instruction has been encountered. For example, the VMX instruction has been encountered while the polymorphic unit is configured to be used as floating point unit in accordance with the Power Architecture™ instruction set specification, and the register file of the polymorphic unit includes the architectural state of the floating point register file specified by the Power Architecture™ instruction set architecture specification.

The function block 230 performs an indicating step to cause a state reload and a data path reconfiguration, and passes control to a function block 260.

The function block 260 decodes the current Power Architecture™ instruction, and passes control to function block 250. Method step 260 generally corresponds to a decode unit having a second mode of operation in an apparatus. Regarding function block 260, the decoding may involve generating internal operation codes, generating one or more microcode sequences, extracting register specifiers, and immediate fields, and so forth. Moreover, if the current Power Architecture™ instruction is a VMX instruction, then function block 220 routes the current Power Architecture™ instruction to the polymorphic function unit.

The function block 250 performs a test to determine whether or not an FPU instruction has been encountered. If an FPU instruction has not been encountered, then control is returned to function block 260. Otherwise, if an FPU instruction has been encountered, then control is passed to a function block 240.

Regarding the function block 240, a floating point instruction has been encountered. For example, a floating point instruction has been encountered while the polymorphic unit is configured to be used as VMX unit in accordance with the Power Architecture™ instruction set specification, and the register file of the polymorphic unit includes the architectural state of the VMX register file specified by the Power Architecture™ instruction set architecture specification.

The function block 240 performs an indicating step to cause a state reload and a data path reconfiguration, and returns control to function block 220.

The function blocks 230 and 240 may perform the described indicating steps in a variety of ways. For example, in an embodiment, the indicating step may insert a sequence of internal operations to unload and reload the register file and reconfigure the data path. In another embodiment of the indicating step, control is transferred to microcode. In yet another embodiment of the indicating step, an exception is raised and control is transferred to one of firmware, hypervisor or operating system. It is to be appreciated that the preceding ways to perform the above-described indicating step are merely illustrative and, thus, other ways may also be employed given the teachings provided herein.

The method 200 of FIG. 2 presumes that the processor initially starts with the polymorphic unit configured as floating point unit. In an alternate embodiment, decoding begins with function block 250 with the polymorphic unit initially configured as VMX unit. In another embodiment, firmware, the hypervisor, the operating system, and/or a user program may perform an initial configuration before instructions targeting the polymorphic unit can be decoded.

While the method 200 of FIG. 2 has been described in terms of decoding two exemplary instruction set classes corresponding to a first set of Power Architecture™ floating point instructions and a second set of Power Architecture™ VMX instructions, given the teachings provided herein, other architectural units may be implemented on a common polymorphic unit and decoding can be practiced in conjunction with such other instruction classes.

A description will now be given regarding an exemplary embodiment that uses static scheduling in an in-order processor.

Figure 3:
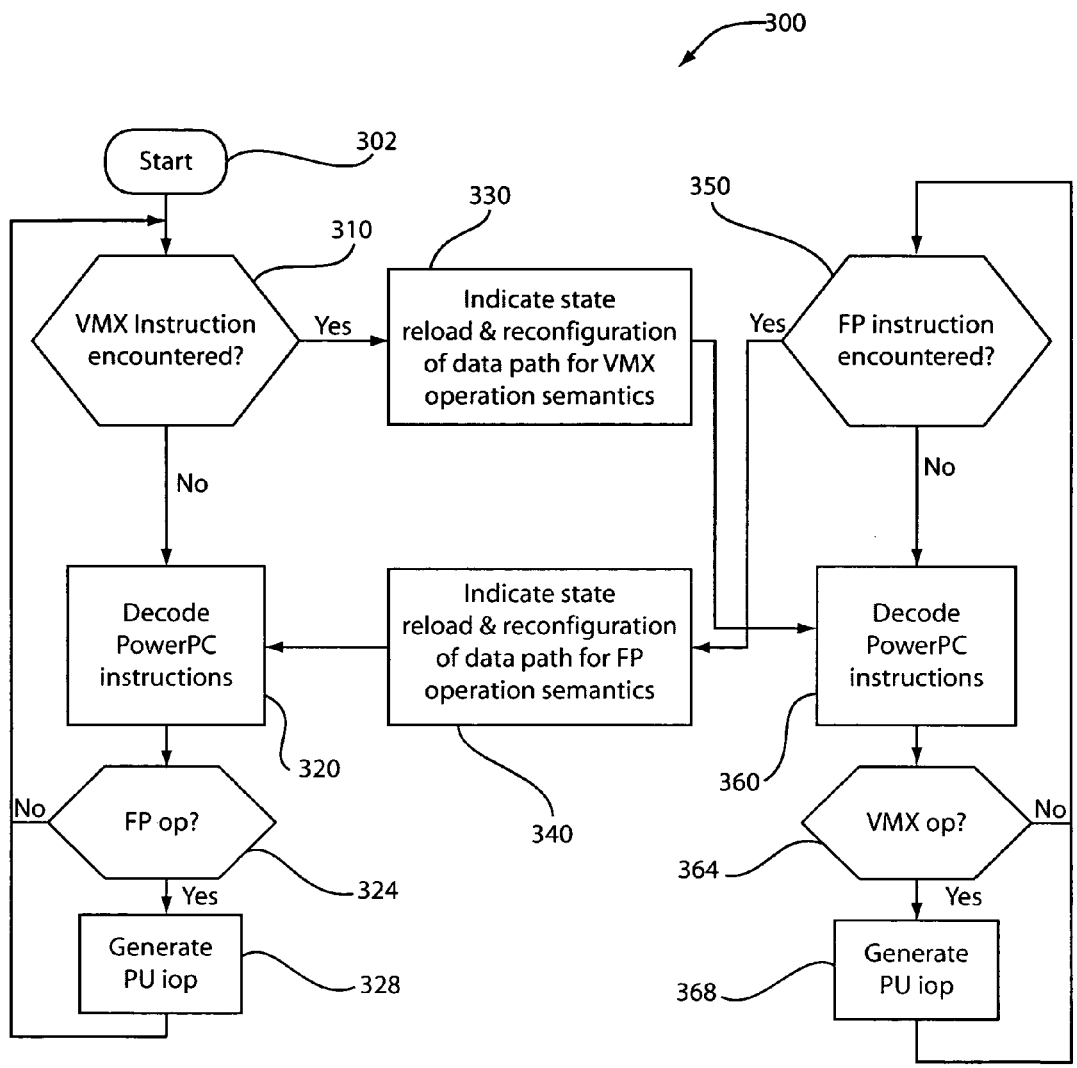
FIG. 3 is a flow diagram illustrating another exemplary method for decoding instructions for a processor implementing floating point and VMX on a common polymorphic unit in accordance with the principles of the present invention.

Turning now to FIG. 3, an exemplary decode method in accordance with the present invention wherein a common internal operation (IOP) is generated for instructions targeting the polymorphic unit is indicated generally by the reference numeral 300. In accordance with the present invention, the decode logic is configured to either decode floating point instructions, or VMX instructions into the common internal operation targeting the polymorphic function unit, and perform an indication step if a non-configured instruction is processed.

A start block 302 passes control to a function block 310. The function block 310 performs a test to determine whether or not a VMX instruction has been encountered. If a VMX instruction has not been encountered, then control is passed to a function block 320. Otherwise, if a VMX instruction has been encountered, then control is passed to a function block 330.

The function block 320 decodes the current Power Architecture™ instruction, and passes control to a function block 324. Regarding function block 320, the decoding of the current instruction may involve generating internal operation codes, generating one or more microcode sequences, extracting register specifiers, and immediate fields, and so forth.

The function block 324 performs a test to determine whether or not the current Power Architecture™ instruction is an FPU instruction. If the current instruction is not an FPU instruction, then control is returned to step 310. Otherwise, if the current instruction is an FPU instruction, then control is passed to a function block 328.

The function block 328 translates the current Power Architecture™ instruction (i.e., the Power Architecture™ FPU instruction) into an internal common IOP targeting the polymorphic function unit, and returns control to function block 310. Thus, when an FPU-class floating point add is encountered, a polymorphic "add" IOP is generated, the configuration of the polymorphic unit guaranteeing that rounding, overflow handling, denormlization, and so forth, will be performed in accordance with the architectural floating point state (such as contained in the floating point status and control register FPSCR), and in accordance with the FPU architectural specification, optionally further including the de-energizing of a portion of the polymorphic data path not required for processing of FPU class instructions (e.g., a second vector element pipeline). De-energizing can be performed using a variety of known and future de-energizing methods, including but not limited to, clock gating and power gating.

Regarding the function block 330, a VMX instruction has been encountered. For example, the VMX instruction has been encountered while the decode unit is configured to, generate a common internal IOP targeting the polymorphic function unit for Power Architecture™ FPU operations and the polymorphic unit is configured to be used as floating point unit in accordance with the Power Architecture™ instruction set specification, and the register file of the polymorphic unit includes the architectural state of the floating point register file specified by the Power Architecture™ instruction set architecture specification.

The function block 330 performs an indicating step to cause a state reload and a data path reconfiguration, and passes control to a function block 360.

The function block 360 decodes the current Power Architecture™ instruction, and passes control to function block 364. Regarding function block 360, the decoding may involve generating internal operation codes, generating one or more microcode sequences, extracting register specifiers, and immediate fields, and so forth. Moreover, if the current Power Architecture™ instruction is a VMX instruction, then function block 320 routes the current Power Architecture™ instruction to the polymorphic function unit.

The function block 364 performs a test to determine whether or not the current Power Architecture™ instruction is a VMX instruction. If the current Power Architecture™ instruction is not a VMX instruction, then control is passed to a function block 250. Otherwise, if the current Power Architecture™ instruction is a VMX instruction, then control is passed to a function block 368.

The function block 368 translates the current Power Architecture™ instruction (i.e., the Power Architecture™ VMX instruction) into a common internal operation code (IOP) targeting the polymorphic function unit, and passes control to a function block 350. Thus, when a VMX-class floating point add is encountered, a polymorphic "add" IOP is generated, the configuration of the polymorphic unit guaranteeing that rounding, overflow handling, denormlization, and so forth, will be performed in accordance with the architectural VMX state (such as contained in the vector status and control register VSCR, said VSCR optionally residing in a physically shared register with the FPSCR), and in accordance with the VMX architectural specification, optionally further including the bypassing or de-energizing of a portion of the polymorphic data path not required for processing of VMX class instructions (such as, including, but not limited to, denormalized number and NaN handling logic).

The function block 350 performs a test to determine whether or not an FPU instruction has been encountered. If an FPU instruction has not been encountered, then control is returned to function block 360. Otherwise, if an FPU instruction has been encountered, then control is passed to a function block 340.

Regarding the function block 340, a floating point instruction has been encountered. For example, a floating point instruction has been encountered while the decode unit is configured to generate a common internal IOP targeting the polymorphic function unit for Power Architecture™ VMX operations and the polymorphic unit is configured to be used as VMX unit in accordance with the Power Architecture™ instruction set specification, and the register file of the polymorphic unit includes the architectural state of the VMX register file specified by the Power Architecture™ instruction set architecture specification. The function block 340 performs an indicating step to cause a state reload and a data path reconfiguration, and returns control to function block 320.

The function blocks 330 and 340 may perform the above-described indicating steps in a variety of ways. For example, in an embodiment, the indicating step may insert a sequence of internal operations to unload and reload the register file and reconfigure the data path. In another embodiment of the indicating step, control is transferred to microcode. In yet another embodiment of the indicating step, an exception is raised and control is transferred to one of firmware, a hypervisor and/or an operating system. It is to be appreciated that the preceding ways to perform the above-described indicating step are merely illustrative and, thus, other ways may also be employed given the teachings provided herein.

In one apparatus implementing the method of FIG. 3, method steps 320 and 360 represent a decode apparatus being in a first and second mode of operation.

The method 300 of FIG. 3 presumes that the processor initially starts with the polymorphic unit configured as a floating point unit. In an alternate embodiment, decoding starts with step 250 with the polymorphic unit initially configured as a VMX unit. In another embodiment, firmware, the hypervisor, the operating system, and/or a user program may perform an initial configuration before instructions targeting the polymorphic unit can be decoded.

While the method 300 of FIG. 3 has been described in terms of decoding two exemplary instruction set classes corresponding to a first set of Power Architecture™ floating point instructions and a second set of Power Architecture™ VMX instructions, given the teachings provided herein, other architectural units may be implemented on a common polymorphic unit and decoding can be practiced in conjunction with such other instruction classes.

Figure 4:
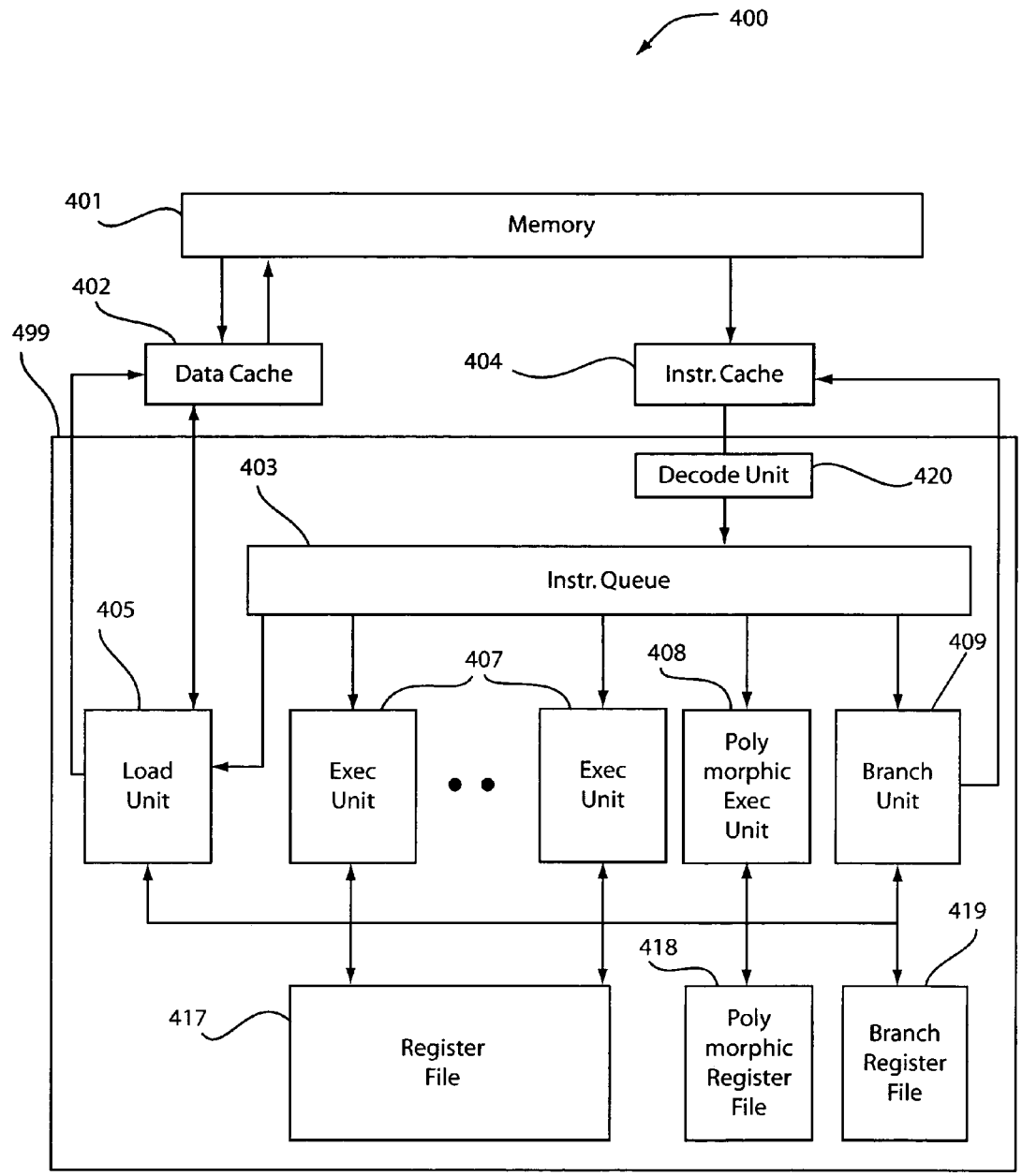
FIG. 4 is a block diagram illustrating an exemplary in-order microprocessor implementing a polymorphic unit in accordance with the principles of the present invention.

Turning now to FIG. 4, a processing system having a processor provided with a polymorphic execution unit to support the execution of Power Architecture™ FPU and Power Architecture™ VMX instructions on a common function unit as described above is indicated generally by the reference numeral 400. The system 400 includes: a memory subsystem 401; a data cache 402; an instruction cache 404; and a processor unit 499. The processor unit 499 includes an instruction queue 403; one or more load units 405 (one shown); several execution units 407 that perform integer and logic operations; a polymorphic execution unit 408 which can be configured to execute either Power Architecture™ FPU instructions or Power Architecture™ VMX instructions; a branch unit 409; and register files 417, 418 and 419.

Instructions are fetched from the instruction cache 404 (or the memory subsystem 401, if the instruction(s) is not in the instruction cache) under the control of the branch unit 409 and are placed in the instruction queue 403. Instructions are decoded and dispatched in accordance with the exemplary methods 200 and 300 of FIGS. 2 and 3, respectively, from the instruction queue 403 to the load unit(s) 405, execution units 407, polymorphic execution unit 408 and branch unit 409 for execution. These units interact with the register files 417, 418 and 419 to access the operands used by the instructions and save the results produced by the execution of the instructions. The register files typically include general-purpose registers 417 (GPRs), and branch-related registers such as link (LRs), count (CTRs) and condition registers (CRs) 419. Polymorphic register file 418 can be configured to hold state information for either the VMX vector registers (VRs) or floating point registers (FPRs). The load unit(s) 305 also interacts with the data cache 402 and the memory subsystem 401, to load data used by the instructions that are executed by the execution units 407 and/or polymorphic execution unit 408 and/or branch unit 409, and to store results generated by the execution units.

In accordance with the principles of the present invention, in a first mode of operation, the decode unit 420 decodes instructions directed towards the execution of non-VMX instructions and the polymorphic execution unit 408 is configured to process FPU instructions. In a second mode of operation, the decode unit decodes instructions directed towards the execution of non-FPU instructions and the polymorphic execution unit 408 is configured to process VMX instructions.

In one exemplary embodiment in accordance with the method 200 of FIG. 2, dispatch logic of instruction queue 403 routes FPU instructions to polymorphic execution unit 408 in said first mode of operation, and VMX floating-point instructions to polymorphic execution unit 408 in said second mode of operation.

In one exemplary embodiment in accordance with the method 300 of FIG. 3, the decode logic 420 translates one of FPU and VMX instructions into a common internal operation targeting the polymorphic execution unit 408, in a first and second mode of operation, respectively.

A description will now be given regarding an exemplary embodiment that uses dynamic scheduling in an out-of-order processor.

A conventional implementation of a processor capable of dynamically scheduling instructions (an out-of-order issue processor) includes at least some of the following features: (1) a mechanism (hereinafter mechanism 1) for issuing instructions out-of-order, including the ability to detect dependencies among the instructions, rename the registers used by an instruction, and detect the availability of the resources used by an instruction; (2) a mechanism (hereinafter mechanism 2) for maintaining the out-of-order state of the processor, which reflects the effects of instructions as they are executed (out-of-order); (3) a mechanism (hereinafter mechanism 3) for retiring instructions in program order, simultaneously updating the in-order state with the effects of the instruction being retired; and (4) a mechanism (hereinafter mechanism 4) for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 is used to retire instructions when the effects of the instruction being retired are correct. Mechanism 4 is used instead, whenever there is some abnormal condition resulting from the execution of the instruction being retired or from some external event.

Figure 5:
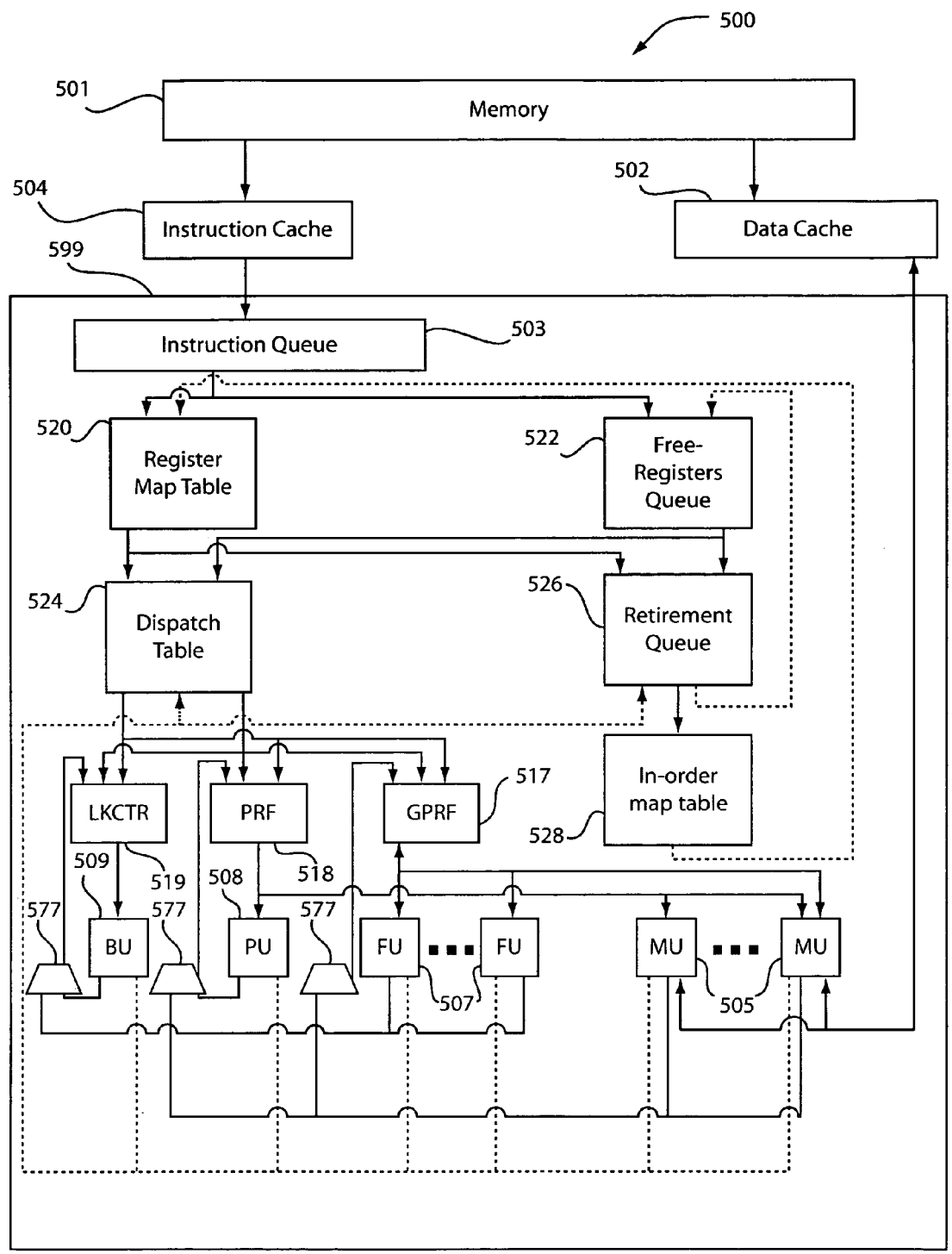
FIG. 5 is a block diagram illustrating an out-of-order processor to which the present invention may be applied.

Turning now to FIG. 5, a processing system having a superscalar processor provided with hardware resources to support reordering of instructions is indicated generally by the reference numeral 500. The reordering of instructions is performed by the system 500 using the mechanisms listed above (mechanism 1-4).

The system 500 includes: a memory subsystem 501; a data cache 502; an instruction cache 504; and a processor unit 599. The processor unit 599 includes an instruction queue 503; several memory units 505 that perform load and store operations; several functional units 507 that perform integer, logic and floating-point operations; a branch unit 509; register files 517, 518 and 519; at least one register map table 520; a free-registers queue 522; a dispatch table 524; a retirement queue 526; an in-order map table 528, and selectors 577.

In the system 500, instructions are fetched from the instruction cache 504 (or from the memory subsystem 501, if the instructions are not in the instruction cache) under the control of the branch unit 509, and are placed in the instruction queue 503. Instructions are extracted from the instruction queue 503 and decoded to extract operation code, register specifiers, immediate fields, and so forth. The architected register names used by the instructions for specifying the operands are renamed according to the contents of the register map table 520, which specifies the current mapping from architected register names to physical registers. The architected register names used by the instructions for specifying the destinations for the results are assigned physical registers extracted from the free-register queue 507, which includes the names of physical registers not currently being used by the processor. The register map table 520 is updated with the assignments of physical registers to the architected destination register names specified by the instructions. Instructions with all their registers renamed are placed in the dispatch table 524; instructions are also placed in the retirement queue 526, in program order, including their addresses, their physical and their architected register names. Instructions are dispatched from the dispatch table 524 when all the resources used by the instructions are available (physical registers have been assigned the expected operands, and functional units are free). The operands used by the instruction are read from the respective register files, which typically includes general-purpose registers 517 (GPRs), and branch-related registers such as Link (LRs), Count (CTRs) and Condition Registers 519 (CRs). In addition a polymorphic register file 518 is provided storing either floating-point registers (FPRs) or vector registers (VRs). Instructions are executed, potentially out-of-order, in a corresponding memory unit 505, functional unit 507, or branch unit 509. Upon completion of execution, the results from the instructions are placed in the register file 511. Instructions in the dispatch table 524 waiting for the physical registers set by the instructions completing execution are notified. The retirement queue 526 is notified of the instructions completing execution, including whether the instructions raised any exceptions. Completed instructions are removed from the retirement queue 526, in program order (from the head of the queue). At retirement time, if no exceptions were raised by an instruction, the in-order map table 528 is updated so that architected register names point to the physical registers in the register file 511 including the results from the instruction being retired; the previous register names from the in-order map table 528 are returned to the free-registers queue 522. On the other hand, if an instruction has raised an exception, program control is set to the address of the instruction being retired from the retirement queue 526; the retirement queue 526 is cleared (flushed), thus canceling all unretired instructions; the register map table 520 is set to the contents of the in-order map table 528; and any register not in the in-order map table 528 is added to the free-registers queue 522.

In addition to the components above, superscalar processors may include other components such as branch-history tables to predict the outcome of branches.

In accordance with an embodiment, a superscalar processor that supports execution of two or more architectural classes of instructions on a polymorphic execution unit is augmented with at least some of the following: (a) a mechanism (hereinafter mechanism a) for tracking the state of the polymorphic register file and the polymorphic execution unit; (b) a mechanism (hereinafter mechanism b) for decoding instructions to be executed in the polymorphic execution unit; (c) a mechanism (hereinafter mechanism c) for performing an indicating step when the state associated with the polymorphic register file needs to be reloaded, and/or the polymorphic execution unit needs to be reconfigured; (d) a mechanism (hereinafter mechanism d) for re-loading the polymorphic register file by unloading the register state associated with a first class of instructions and loading the register state associated with a second class of instructions; and (e) a mechanism (hereinafter mechanism e) for reconfiguring the polymorphic execution unit to perform operations in accordance with the semantic specification of a first class of instructions in a first mode of operation, and in accordance with the semantic specification of a second class of instructions in a second mode of operation.

The mechanisms disclosed herein are used in conjunction with mechanisms available in the out-of-order processor shown in FIG. 5, as follows. Mechanism a is used to determine whether the processor is in a first or second mode of operation. In a first mode of operation, Power Architecture™ FPU instructions are decoded and dispatched to the polymorphic execution unit in accordance with mechanism b. When a VMX instruction is encountered in a first mode of operation, an indicating step is performed in accordance with mechanism c. In a second mode of operation, Power Architecture™ VMX instructions are decoded and dispatched to the polymorphic execution unit in accordance with mechanism b. When an FPU instruction is encountered in a first mode of operation, an indicating step is performed in accordance with mechanism c.

In response to the indicating step of mechanism c, mechanism d is employed to update the state of the polymorphic register file 518, and mechanism e is employed to reconfigure the operation of polymorphic execution unit 508. After the operation of mechanisms d and e, the mode of operation is updated to enable the execution of FPU instructions in the polymorphic execution unit in a first mode of operation, or the execution of VMX instructions in the polymorphic execution unit in a second mode of operation, when an FPU and a VMX instruction have been detected by the decode logic of mechanism b.

In accordance with an embodiment, the indicating step is performed in-order, i.e., only when the instruction triggering the indicating step is the next-to-complete instruction. Of course, the indicating step is not limited to be performed in-order as described, and may be performed in other ways in accordance with other embodiments.

Figure 6:
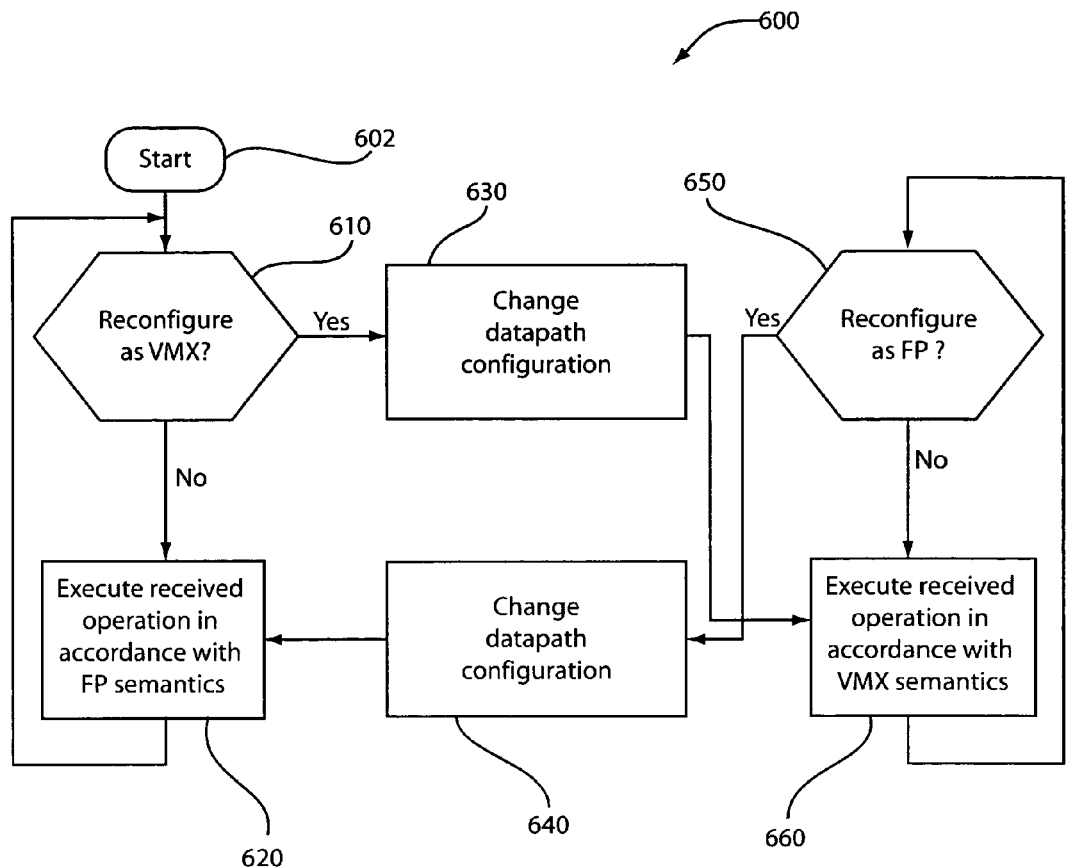
FIG. 6 is a block diagram illustrating the operation of the polymorphic unit 408 or 508 of FIGS. 4 and 5, respectively, in accordance with the principles of the present invention.

Turning to FIG. 6, an exemplary method for the execution of operations in one of polymorphic execution unit 408 or 508 of FIGS. 4 and 5, respectively, is indicated generally by the reference numeral 600.

A start block 602 passes control to a function block 610. The function block 610 performs a test to determine whether or not the polymorphic unit should be reconfigured to execute VMX instruction. If the polymorphic unit should not be reconfigured to execute VMX instruction, then control is passed to a function block 620. Otherwise, if the polymorphic unit should be reconfigured to execute VMX instruction, then control is passed to a function block 630. Regarding function block 610, the described test may be performed in response to any of the indicating steps 230 or 330 of FIGS. 2 and 3, respectively, or mechanism c used in conjunction with the embodiment of FIG. 5.

The function block 620 executes the current operation in accordance with the current configuration, and returns control to function block 610.

Regarding the function block 630, a reconfiguration request has been received and, thus, function block 630 reconfigures the polymorphic execution unit to perform operations in accordance with VMX semantics (e.g., to use denorm handling in accordance with the VSCR register and employ VMX default rounding mode), and passes control to a function block 660.

The function block 660 executes the current operation in accordance with the current configuration, and passes control to function block 650.

The function block 650 performs a test to determine whether or not the polymorphic execution unit should be configured to execute FPU instructions. If the polymorphic execution unit should not be configured to execute FPU instructions, then control is returned to function block 620. Otherwise, if the polymorphic execution unit should be configured to execute FPU instructions, then control is passed to a function block 640. Regarding function block 650, the described test may be performed in response to any of the indicating steps 240 or 340 of FIGS. 2 and 3, respectively, or mechanism c used in conjunction with the embodiment of FIG. 5.

Regarding the function block 640, a reconfiguration request has been received, and, thus, function block 640 reconfigures the polymorphic execution unit to perform operations in accordance with FPU semantics (e.g., to use denorm handling in accordance with the FPSCR register and employ the rounding mode specified in the FPSCR register), and passes control to a function block 620.

The function blocks 630 and 640 may perform the above-described reconfiguration steps in a variety of ways. For example, in an embodiment, the function block 630 may perform the reconfiguration step by loading an "internal FPSCR" register with the rounding modes specified by the VMX specification and configuring an update logic path to mirror any VSCR updates into the FPSCR register. In an embodiment, the function block 640 may perform the reconfiguration step by loading the architectural FPSCR into the "internal FPSCR" when the polymorphic unit is configured to execute FPU instructions. In an embodiment, a number of internal control bits are configured to effect the handling of operations having signaling NaN operands in accordance with the IEEE floating point specification and so forth. In yet other embodiments, other implementations of the configuration steps may be employed given the teachings provided herein.

In one apparatus implementing the method of FIG. 6, methods steps 620 and 660 correspond to a polymorphic execution unit in a first and second mode of operation.

The method 600 of FIG. 6 presumes that the processor initially starts with the polymorphic unit configured as a floating point unit. In an alternate embodiment, decoding starts with step 650 with the polymorphic unit initially configured as a VMX unit. In another embodiment, firmware, the hypervisor, the operating system, and/or a user program may perform an initial configuration before instructions targeting the polymorphic unit can be decoded.

While the method 600 of FIG. 6 has been described in terms of executing two exemplary instruction set classes corresponding to a first set of Power Architecture™ floating point instructions and a second set of Power Architecture™ VMX instructions, other architectural units may be implemented on a common polymorphic unit and decoding can be practiced in conjunction with such other instruction classes.

Given the teachings provided herein, a number of embodiments can be practiced. In an embodiment, prefetching of state updates is performed. Moreover, the state reloading step is initiated while the indicating step is still speculative when a first instruction of a new instruction class to be executed on the polymorphic execution unit is detected. In accordance with the embodiment, the reloading step allocates physical rename registers and preloads the new state to the physical rename registers. The map table is then updated to point to preloaded physical registers when the indicating step becomes non-speculative.

According to this embodiment, a number of registers are dynamically removed from the free list when the first instruction from the other unit is fetched, and preload is started early. While this reduces the number of rename registers available to the first unit at a time when the need for rename registers available to the first unit is also likely to be low, because more and more of the new instructions being fetched are likely to be for the second unit. Thus, there should not be any noticeable performance loss for making some of the physical registers available to the second unit, while the first unit is still executing the remaining instructions in flight. This allows all physical registers to be available to the single unit in use, but allows better performance in cases where rapid switch between units occurs. Preloading may be initiated by first loading the registers that are being referenced in the first few instructions being fetched, as a further optimization.

In accordance with another embodiment, unloading of a register state is performed in the background by a register store engine by delaying release of physical registers, performing stores of the physical registers, and then gradually releasing the physical registers as they have be written to dormant state storage.

In accordance with yet another embodiment, reconfiguration can be performed speculatively, when no instructions associated with a previous instruction class are in-flight, and the first instruction from a new instruction class has been detected. In an embodiment, a count of in-flight instructions targeting the polymorphic instruction unit is maintained to determine whether instructions are in-flight. In another embodiment, a global completion table GCT generates a signal identifying whether one or more entries include a valid instruction using the polymorphic execution unit.

In one embodiment, a flush occurs after reconfiguration steps (either in response to invoking a software handler), whereas in another embodiment instructions of the select-updated execution type are optionally held in at least one of an issue queue and dispatch logic.

In an embodiment, an operating system executing on a system employing the present invention stores the configuration in the per task (or per process) structure, so when a process is dispatched, the process starts executing with the least recently employed configuration prior to context switch.

In one embodiment, load and store operations are supported by the secondary register file storing dormant state. This may allow the support of efficient epilog/prolog and context switch handling, where VMX or FP registers may be saved, but are not used in the data path. In another embodiment, the operating system is specially equipped to identify which context is switched in and which context is in secondary array, and uses appropriate sequence information to perform a context switch without the need to transfer the state to the primary register file for use with the floating point load "lf" or vector load "lv" instructions, and floating point store "stf" and vector store "stv" instructions.

In one embodiment, code optimization for code targeting microprocessors employing the present invention avoid generating code interspersing the use of two architectural units targeting the same polymorphic execution unit to reduce the number of state reload and reconfiguration operations.

In one embodiment, no state reloading is necessary, since the architectural state is shared. In another embodiment, no data path configuration is necessary because the semantic specification of the operations is shared between two sets of instruction classes.

A brief description of some of the many advantages and features of the present invention will now be described. For example, embodiments disclosed herein advantageously allow for the sharing of physical execution resources between multiple units, e.g., between a scalar and vector unit, wherein only the unit currently in use consumes physical registers, e.g., between an AMD/INTEL SSE vector and an AMD/INTEL x87 FP register file, or between an IBM Power Architecture™ FPU register file and an IBM Power Architecture™ VMX vector register file.

Moreover, execution resources may be advantageously shared between multiple architectural units and, further, sharing of architectural state may be used to simplify input and output data routing.

In an embodiment, similar, but not identical, operations may be executed on a common data path by reconfiguring the data path in a polymorphic function unit, exploiting relatively static instruction set usage patterns of application programs to reduce the size of internal operations and allow preselection of the configuration of the data path while reducing the latency to make such selection dynamically in response to each instruction being processed.

In an embodiment, the data path of a polymorphic function unit may be dynamically configured when a new instruction usage pattern is detected, and the data path for the detected new instruction usage pattern may be preconfigured. Thus, in an embodiment, when an application using Power Architecture™ VMX code is detected, default VMX rounding mode is selected. When execution behavior changes to exploit Power Architecture™ floating point operations, the data path is reconfigured to use FPSCR specified rounding modes.

According to one embodiment, a physical register file is shared between two "largely mutually exclusive" units, e.g., between a scalar FP instruction set architecture, and a new, more advanced vector instruction set architecture. In accordance with this embodiment, a shared physical array includes one of multiple possible architected states, such as an SSE state, or an x87 state. When a first SSE instruction is identified, the microprocessor unloads the previous state, e.g., an x87 state, into a predefined architected storage area, and loads the SSE architected state from a predefined location.

In accordance with one embodiment, this can be performed in microcode, in firmware code, and/or by an operating system fault handler. This allows the state saving to be done in a non-critical area of the chip for improving the cycle time or efficient floor-planning. Also, the architected state can be stored in a larger, slower secondary memory array in the processor chip (such as, e.g., SRAM or eDRAM), in a designated memory area (e.g., in kernel space), and/or possibly in external memory.

In addition to simplifying state maintenance and reducing the number of fast, area intensive first-level register files, this approach also allows efficient sharing of execution resources over an implementation maintaining separate arrays for both structures, which involve selecting input data from multiple sources, and creates wiring congestion at the input to the data path.

Referring now to the performance profile of multiple architectural units using a single physical polymorphic function unit with a polymorphic register file and a polymorphic data path, the performance impact of reconfiguration is a function of both the cost to perform the reconfiguration of the data path and the cost to perform loading and unloading of the state of multiple separate architectural register files to a single physical register file in response to program execution. In preferred execution behavior, these events occur when either a new program is dispatched by the operating system, or a different phase within a single program is entered.

In one embodiment, optimizations are performed to reduce the costs of reconfiguring the data path and/or loading and unloading of architectural state associated with different architectural units mapped to a single polymorphic unit implemented physically.

In one preferred embodiment of code generation, a compiler generates large code sections having only one architectural class mapping to a given polymorphic unit to reduce the number of polymorphic unit reconfiguration, and its associated cost. In one embodiment, the compiler only uses one class, said second class being confined to support for legacy code.

In one embodiment, reloading the state of a polymorphic unit from dormant memory, at least one of application state, operating state, hypervisor state and another privileged state will be performed.

Therefore, the embodiments disclosed herein advantageously provide methods and apparatus for sharing execution resources, such as register files and execution data paths between several distinct architectural units, to reduce design area, design complexity, power dissipation and design cost. Advantageously, this may be achieved by exploiting dynamic program behavior to optimize design complexity and area to deliver the highest performance with minimal area and power consumption.

Moreover, the embodiments disclosed herein provide a method and apparatus for sharing execution resources between multiple architectural units to reduce chip area, design complexity and power consumption, while simplifying data routing.

Further, the embodiment disclosed herein provide a method and apparatus for sharing common execution resources between architectural units that have different execution semantics.

Additionally, the embodiments disclosed herein provide the ability to perform optimized circuit implementations of function units with the ability to configure the semantics of like execution primitives.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for executing instructions in a processor having a polymorphic execution unit, comprising:

reloading a state associated with a first instruction class of an instruction set architecture and reconfiguring the polymorphic execution unit to operate in accordance with the first instruction class, directly responsive to an instruction of the first instruction class being encountered and the polymorphic execution unit being configured to operate in accordance with a second instruction class;

reloading a state associated with a second instruction class of the instruction set architecture and reconfiguring the polymorphic execution unit to operate in accordance with the second instruction class, directly responsive to an instruction of the second instruction class being encountered and the polymorphic execution unit being configured to operate in accordance with the first instruction class; and executing, in another execution unit, other instructions from the instruction set architecture than any of the instructions from the first and the second instruction classes;

wherein the state associated with either the first or the second instruction class is maintained unmodified in a de-configured state storage element, when the state associated with either the first or the second instruction class is unloaded from a register file operatively coupled to the polymorphic execution unit, and wherein a state associated with the other instructions is maintained in a register file operatively coupled to the other execution unit.

2. The method of claim 1, wherein at least one of, said step of reloading the state associated with the first instruction class comprises storing the state associated with the second instruction class in an on-chip memory, and said step of reloading the state associated with the second instruction class comprises storing the state associated with the first instruction class in an on-chip memory.

3. The method of claim 1, wherein at least one of said reloading steps and said reconfiguring steps are performed under the control of at least one of a dedicated logic circuit, a state machine, microcode, firmware, hypervisor, an operating system, and a dedicated function executing in user space.

4. The method of claim 1, wherein the polymorphic execution unit comprises at least two polymorphic execution units, and at least one of said reconfiguring steps reconfigures at least one of the polymorphic execution units independently of at least another one of the at least two polymorphic execution units.

5. The method of claim 1, further comprising generating a signal indicating a current non-configured state, directly responsive to the instruction of the first instruction class being encountered and the polymorphic execution unit being configured to operate in accordance with the second instruction class.

6. The method of claim 1, further comprising translating at least one of the instructions of at least one of the first and second instruction classes into a common internal operation targeting the polymorphic execution unit.

7. The method of claim 1, wherein the first instruction class is the floating point (FPU) instruction set architecture, and said step of reconfiguring the polymorphic execution unit to operate in accordance with the first instruction class comprises loading an architectural Floating Point Status and Control Register (FPSCR) into an internal status and control register.

8. The method of claim 1, wherein the second instruction set class is the VMX instruction set architecture, and said step of reconfiguring the polymorphic execution unit to operate in accordance with the second instruction class comprises at least one of:
loading an internal status and control register with rounding modes specified by the VMX instruction set architecture; and
maintaining VMX-specified architectural status and control information within the internal status and control register.

9. The method of claim 1, wherein at least one of, said step of reconfiguring the polymorphic execution unit to operate in accordance with the first instruction class comprises pre-fetching updates to the state associated with the first instruction class, and said step of reconfiguring the polymorphic execution unit to operate in accordance with the second instruction class comprises pre-fetching updates to the state associated with the second instruction class.

10. The method of claim 9, further comprising indicating a current mis-configured state, when the instruction of the first instruction class is encountered and the polymorphic execution unit is configured to operate in accordance with the second instruction class, or when the instruction of the second instruction class is encountered and the polymorphic execution unit is configured to operate in accordance with the first instruction class, and wherein said reloading step is initiated while said indicating step is speculative.

11. The method of claim 10, wherein said reloading step comprises allocating physical rename registers and preloading the physical rename registers with the state associated with one of the first or the second instruction classes.

12. The method of claim 1, wherein at least one of said reloading steps is performed speculatively by at least updating a global completion table to point to preloaded physical rename registers.

13. The method of claim 1, wherein said step of reconfiguring the polymorphic execution unit to operate in accordance with the first instruction class comprises de-configuring the polymorphic execution unit from operating in accordance with the second instruction class by delaying a release of physical registers, performing write operations to the physical registers involving the state associated with the second instruction class, and then releasing the physical registers as the state associated with the second instruction class is written to a dormant state storage.

14. The method of claim 13, wherein said step of de-configuring the polymorphic execution unit from operating in accordance with the second instruction class is performed speculatively when there is an absence of in-flight instructions associated with the second instruction class.

15. The method of claim 14, wherein said step of de-configuring the polymorphic execution unit from operating in accordance with the second instruction class comprises maintaining one of an in-flight instruction count and an in-flight instruction indication targeting the polymorphic execution unit to determine whether instructions corresponding to the previously configured instruction class are in-flight.

16. The method of claim 15, wherein the in-flight instruction indication is generated by logic associated with a global completion table, to identify whether one or more entries in the global completion table include a valid instruction of the first or the second instruction classes.

17. A processor, comprising:
a polymorphic execution unit, having shared logic, and being reconfigurable to switch between operating in accordance with a first or a second instruction class, respectively, of a single instruction set architecture, directly responsive to a currently encountered instruction being of the first instruction class and the polymorphic execution unit being currently configured to operate in accordance with the second instruction class, or the currently encountered instruction being of the second instruction class and polymorphic execution unit being currently configured to operate in accordance with the first instruction class, respectively;
an execution unit for executing other instructions from the single instruction set architecture than instructions of the first and the second instruction class; and
a decode unit configured to provide a signal indicating a current mis-configured state directly responsive to an instruction class of the currently encountered instruction differing from that of a current configuration of the polymorphic execution unit,
wherein all of the instructions in the first instruction class and the second instruction class are configured to respectively force the reloading of the state and the reconfiguring of the polymorphic execution unit associated with the second instruction class and the first instruction class, respectively, when encountered and the polymorphic execution unit is configured to operate in accordance with the second instruction class and the first instruction class, respectively, and
wherein the other instructions from the single instruction set architecture than the instructions of the first and the second instruction class are without affect with respect to the reloading of the state and the reconfiguring of the polymorphic execution unit.

18. The processor of claim 17, wherein the shared logic of said polymorphic execution unit is manufactured to include at least one fixed function data path, operation semantics of the at least one fixed function data path being selected under the control of configuration information indicating a selection of operation semantics in accordance with one of the first and the second instruction classes.

19. The processor of claim 17, wherein any portions of the shared logic of said polymorphic execution unit associated with the current mis-configured state is one of de-energized and bypassed.

20. An integrated circuit, comprising:
a processor,
wherein the processor includes:
at least one configurable execution unit and shared logic, configurable to switch from executing instructions in accordance with a first and a second instruction class from an instruction set architecture directly responsive to a current configuration of at least one of the at least one configurable execution unit and an instruction class of a currently encountered instruction;
a first configurable register file, operatively coupled to the at least one configurable execution unit, for maintaining a currently reloaded state associated with the first instruction class;
a de-configured state storage element for maintaining a currently unloaded state associated with the second instruction class;
at least one execution unit unresponsive to the current configuration for executing instructions from the instruction set architecture other than any of the instructions corresponding to the first and the second instruction classes in a manner unresponsive to the current configuration; and a second register file, operatively coupled to said at least one execution unit unresponsive to the current configuration, for storing a state associated with the other instructions, wherein the shared logic of said polymorphic execution unit is manufactured to include at least one fixed function data path, operation semantics of the at least one fixed function data path being selected under the control of configuration information indicating a selection of operation semantics in accordance with one of the first and the second instruction classes, and wherein the currently unloaded state of the first configurable register file stored in the de-configured state storage element, the currently reloaded state stored in the first configurable register file, and the state associated with the other instructions stored in the second register file comprise a portion of a processor state in accordance with the instruction set architecture.

* * * * *